United States Patent
Kong et al.

(10) Patent No.: US 12,536,124 B2
(45) Date of Patent: Jan. 27, 2026

(54) METHOD AND APPARATUS FOR REPAIRING BANDWIDTH SLOWDOWN OF LINK BANDWIDTH OF PCIE MODULE, ELECTRONIC DEVICE, AND STORAGE MEDIUM

(71) Applicant: SUZHOU METABRAIN INTELLIGENT TECHNOLOGY CO., LTD., Jiangsu (CN)

(72) Inventors: Weibin Kong, Jiangsu (CN); Changshun Wu, Jiangsu (CN); Jiayang Zhou, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 3 days.

(21) Appl. No.: 18/564,576

(22) PCT Filed: Apr. 29, 2022

(86) PCT No.: PCT/CN2022/090188
§ 371 (c)(1),
(2) Date: Nov. 27, 2023

(87) PCT Pub. No.: WO2023/056744
PCT Pub. Date: Apr. 13, 2023

(65) Prior Publication Data
US 2024/0378167 A1 Nov. 14, 2024

(30) Foreign Application Priority Data
Oct. 8, 2021 (CN) .......................... 202111168572.7

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ................................................... G06F 13/4221
(Continued)

(56) References Cited

U.S. PATENT DOCUMENTS

| 6,073,199 A | 6/2000 | Cohen et al. |
| 10,754,798 B1 | 8/2020 | Burke et al. |

(Continued)

FOREIGN PATENT DOCUMENTS

| CN | 105930161 A | 9/2016 |
| CN | 107153553 A | 9/2017 |

(Continued)

OTHER PUBLICATIONS

International Search Report for PCT/CN2022/090188 (Jul. 4, 2022).
(Continued)

*Primary Examiner* — Titus Wong
(74) *Attorney, Agent, or Firm* — Merchant & Gould P.C.

(57) ABSTRACT

The present application provides a method and apparatus for repairing bandwidth slowdown, an electronic device, and a storage medium, applied to a BIOS module. The BIOS module is connected to a CPLD module with a register and is configured to communicate with the CPLD module; and the CPLD module is connected to a PCIE module configured with a target bandwidth and is configured to acquire a link bandwidth of the PCIE module. The method includes: acquiring the link bandwidth of the PCIE module from the CPLD module when a device is started; comparing the link bandwidth with the target bandwidth, and determining whether the PCIE module has the bandwidth slowdown; and sending a register connection state control instruction to the CPLD module when the PCIE module has the bandwidth (Continued)

Fig. 2 slowdown, so that the register performs enable and disable connection operations in response according to the received instruction.

18 Claims, 4 Drawing Sheets

(58) Field of Classification Search
USPC .......................................................... 710/105
See application file for complete search history.

(56) References Cited

U.S. PATENT DOCUMENTS

| | | | |
|---|---|---|---|
| 10,775,871 B2* | 9/2020 | Garg | G06F 1/3215 |
| 11,507,421 B2* | 11/2022 | Chan | G06F 11/2284 |
| 11,909,850 B1* | 2/2024 | Kochavi | H04L 1/001 |
| 2008/0263246 A1* | 10/2008 | Larson | G06F 13/372 |
| | | | 710/107 |
| 2010/0188975 A1* | 7/2010 | Raleigh | H04L 63/04 |
| | | | 370/230.1 |
| 2012/0134291 A1* | 5/2012 | Raleigh | G06Q 20/40 |
| | | | 370/252 |
| 2014/0082251 A1* | 3/2014 | Li | G06F 13/4282 |
| | | | 710/316 |
| 2014/0281070 A1* | 9/2014 | Natu | G06F 13/385 |
| | | | 710/105 |
| 2015/0324268 A1* | 11/2015 | Du | G06F 11/0745 |
| | | | 714/43 |
| 2017/0337069 A1* | 11/2017 | Huang | G06F 13/4282 |
| 2019/0089644 A1* | 3/2019 | Shpiner | H04L 49/30 |
| 2020/0042391 A1* | 2/2020 | Pepper | G06F 11/1417 |
| 2020/0081858 A1* | 3/2020 | Philmore | G06F 13/4027 |
| 2020/0218326 A1* | 7/2020 | Garg | G06F 9/3004 |
| 2020/0280518 A1* | 9/2020 | Lee | H04L 47/30 |
| 2020/0285534 A1* | 9/2020 | Chaiken | G06F 11/0745 |
| 2021/0117350 A1* | 4/2021 | Safranek | G06F 12/0806 |
| 2022/0327074 A1* | 10/2022 | Jeon | G06F 1/3275 |
| 2023/0117996 A1* | 4/2023 | Qiu | G06F 11/1417 |
| | | | 714/16 |

FOREIGN PATENT DOCUMENTS

| | | |
|---|---|---|
| CN | 107957885 A | 4/2018 |
| CN | 111488233 A | 8/2020 |
| CN | 112825011 A | 5/2021 |
| CN | 113590511 A | 11/2021 |

OTHER PUBLICATIONS

Search Report for Chinese Patent Application No. 2021111685727 (Nov. 5, 2021).

Search Report for Chinese Patent Application No. 2021111685727 (Dec. 24, 2021).

* cited by examiner

METHOD AND APPARATUS FOR REPAIRING BANDWIDTH SLOWDOWN OF LINK BANDWIDTH OF PCIE MODULE, ELECTRONIC DEVICE, AND STORAGE MEDIUM

CROSS-REFERENCE TO RELATED APPLICATION

This present application is a National Stage Application of PCT International Application No. PCT/CN2022/090188, filed on Apr. 29, 2022, which claims the benefit of priority to Chinese Patent Application No. 202111168572.7, filed on Oct. 8, 2021 in the China National Intellectual Property Administration and entitled "METHOD AND APPARATUS FOR REPAIRING BANDWIDTH SLOWDOWN, AND ELECTRONIC DEVICE", which is hereby incorporated by reference in its entirety. To the extent appropriate, a claim of priority is made to each of the above disclosed applications.

TECHNICAL FIELD

The present application relates to the technical field of device bandwidth processing, and particularly to a method and apparatus for repairing bandwidth slowdown, an electronic device, and a storage medium.

BACKGROUND

Peripheral Component Interconnect Express (PCIE) is a high-speed serial computer extension bus standard. In a development process of the PCIE, an interface version has been developed from PCIE1.0 to PCIE5.0, and a supported bandwidth has gradually evolved from X1 and X2 to X16 and X32. For a Central Processing Unit (CPU) that supports PCIE3.0, a PCIE device in the CPU usually needs to be configured with a corresponding standard bandwidth, such as a standard bandwidth of X16. However, in a device startup or restart process, it is found that the PCIE device with completed bandwidth configuration has a bandwidth slowdown problem. For example, a bandwidth drops from X16 to X1.

In related technologies, the PCIE device with bandwidth slowdown is generally pulled to be reset by the CPU twice for repairing the bandwidth slowdown. However, the second resetting may be performed only after the PCIE device subjected to the first resetting is stabilized for seconds. Generally, a desired duration for stabilization between the two resetting operations is 16 seconds. It takes long time, and the device also has a certain requirement for startup time. Therefore, it is urgent to propose a new method for repairing the bandwidth slowdown to improve the timeliness of repairing the bandwidth slowdown.

SUMMARY

Therefore, the present application provides a method and apparatus for repairing bandwidth slowdown, an electronic device, and a storage medium.

According to a first aspect, embodiments of the present application disclose a method for repairing bandwidth slowdown, applied to a Basic Input Output System (BIOS) module, and the BIOS module is connected to one side of a Complex Programmable Logic Device (CPLD) module with a register and is configured to communicate with the CPLD module; the other side of the CPLD module is connected to a Peripheral Component Interconnect Express (PCIE) module configured with a target bandwidth and is configured to acquire a link bandwidth of the PCIE module; and the method includes: the link bandwidth of the PCIE module is acquired from the CPLD module in a case that a device is started; the link bandwidth is compared with the target bandwidth, and whether the PCIE module has the bandwidth slowdown is determined; and a register connection state control instruction is sent to the CPLD module in a case that the PCIE module has the bandwidth slowdown, so that the register performs enable and disable connection operations in response according to the register connection state control instruction which is received.

In some embodiments, the register connection state control instruction is sent to the CPLD module in the case that the PCIE module has the bandwidth slowdown includes: bandwidth configuration information of the PCIE module is detected in a case that the PCIE module has the bandwidth slowdown; and in a case that the PCIE module is configured with a bandwidth configuration video card, an operation of sending the register connection state control instruction to the CPLD module is performed.

In some embodiments, after the register connection state control instruction is sent to the CPLD module in the case that the PCIE module has the bandwidth slowdown, so that the register performs the enable and disable connection operations in response according to the register connection state control instruction which is received, the method further includes: a result of repairing the bandwidth slowdown of the PCIE module is detected; and in a case that the PCIE module still has the bandwidth slowdown, a step of sending the register connection state control instruction to the CPLD module is repeated, so that the register performs the enable and disable connection operations in response according to the register connection state control instruction which is received, until the step is performed for a target number of times.

In some embodiments, the register connection state control instruction is sent to the CPLD module, so that the register performs the disable and enable connection operations in response according to the register connection state control instruction which is received includes: a register disable connection control instruction is sent to the CPLD module, so that the register performs the disable connection operation in response according to the register disable connection control instruction which is received; and in response to a timing operation, in a case that a duration reaches a target duration, a register enable connection control instruction is sent to the CPLD module, so that the register performs the enable connection operation in response according to the register enable connection control instruction which is received.

In some embodiments, the register connection state control instruction includes: a register disable connection control instruction, a register enable connection control instruction, and a time interval instruction of the register disable and enable connection operations; and the register connection state control instruction is sent to the CPLD module, so that the register performs the disable and enable connection operations in response according to the register connection state control instruction which is received further includes: the register disable connection control instruction is sent to the CPLD module, so that the register performs the disable connection operation in response according to the register disable connection control instruction which is received; and the register enable connection control instruction and the time interval instruction of the register disable and enable connection operations are sent to the CPLD module, so that the register performs an enable connection delay operation in response according to the register enable connection control instruction and the time interval instruction of the register disable and enable connection operations which are received.

In some embodiments, the method further includes: the number of times of repairing the bandwidth slowdown of the PCIE module and a result of repairing the bandwidth slowdown corresponding to each repair operation are sent to the register of the CPLD module for storage.

In some embodiments, the method further includes: bandwidth slowdown information of the PCIE module is sent to the CPLD module, so that the CPLD module stores the bandwidth slowdown information to the register.

In some embodiments, the BIOS module is connected to the side of the CPLD with the register and is configured to communicate with the CPLD module includes:

the BIOS module is connected to the side of the CPLD module with the register through a Central Processing Unit (CPU), and the BIOS module communicates with the CPLD module through an Inter-Integrated Circuit (IIC) bus.

According to a second aspect, the embodiments of the present application disclose an apparatus for repairing bandwidth slowdown, applied to a BIOS module, and the BIOS module is connected to one side of a CPLD module with a register and is configured to communicate with the CPLD module; the other side of the CPLD module is connected to a PCIE module configured with a target bandwidth and is configured to acquire a link bandwidth of the PCIE module; and the apparatus includes: a link bandwidth acquisition component, configured to acquire the link bandwidth of the PCIE module from the CPLD module in a case that a device is started; a slowdown determining component, configured to: compare the link bandwidth with the target bandwidth, and determine whether the PCIE module has the bandwidth slowdown; and an instruction sending component, configured to send a register connection state control instruction to the CPLD module when the PCIE module has the bandwidth slowdown, so that the register performs disable and enable connection operations in response according to the register connection state control instruction which is received.

In some embodiments, the BIOS module is connected to the side of the CPLD with the register and is configured to communicate with the CPLD module includes:

the BIOS module is connected to the side of the CPLD module with the register through a CPU, and the BIOS module communicates with the CPLD module through an IIC bus.

According to a third aspect, the embodiments of the present application further discloses an electronic device, including: at least one processor; and a memory in communication connection with the at least one processor, and the memory stores instructions executable by the at least one processor; and the instructions, when executed by the at least one processor, cause the at least one processor to execute the method for repairing the bandwidth slowdown according to the first aspect or any optional implementation of the first aspect.

According to a fourth aspect, the implementations of the present application further discloses a non-transitory computer-readable storage medium, storing a computer program, and the computer program, when executed by a processor, executes the method for repairing the bandwidth slowdown according to the first aspect or any optional implementation of the first aspect.

BRIEF DESCRIPTION OF THE DRAWINGS

To describe the specific implementation modes of the present application or the technical solutions in the prior art more clearly, drawings required to be used in the specific implementation modes or the illustration of the prior art will be briefly introduced below. Apparently, the drawings in the illustration below are some implementation modes of the present application. Those ordinarily skilled in the art may also obtain other drawings according to these drawings without doing creative work.

DETAILED DESCRIPTION OF THE EMBODIMENTS

The technical solutions of the present application will be clearly and completely described below in conjunction with the accompanying drawings. Apparently, the described embodiments are only a part of the embodiments of the present application, rather than all the embodiments. Based on the embodiments in present application, all other embodiments obtained by those of ordinary skill in the art without creative work shall fall within the protection scope of the present application.

In the descriptions of the present application, it should be noted that the terms "first", "second", and "third" are only used for descriptive purposes, and may not be understood as indicating or implying relative importance. Unless otherwise explicitly specified and defined, the terms "mounted", "coupled" and "connected" shall be understood broadly, and may be, for example, electrical connection, direct connection, connection through an intermediate, internal communication between two elements, wireless connection, or wired connection. For those of ordinary skill in the art, the specific meanings of the above terms in the present application may be understood according to specific situations.

In addition, technical features involved in different implementation modes of the present application described below may be mutually combined as long as they do not constitute conflicts.

a Basic Input Output System (BIOS) is a set of programs fixed to a Read-Only Memory (ROM) chip on a motherboard in a computer, which stores the most important basic input and output programs of the computer, as well as a self-check program after startup and a system autostart program. A Complex Programmable Logic Device (CPLD) is a high-density, high-speed, and low-power digital integrated circuit composed of programming technologies such as a CMOS EPROM, an EEPROM, a flash memory, and an SRAM.

Figure 1:
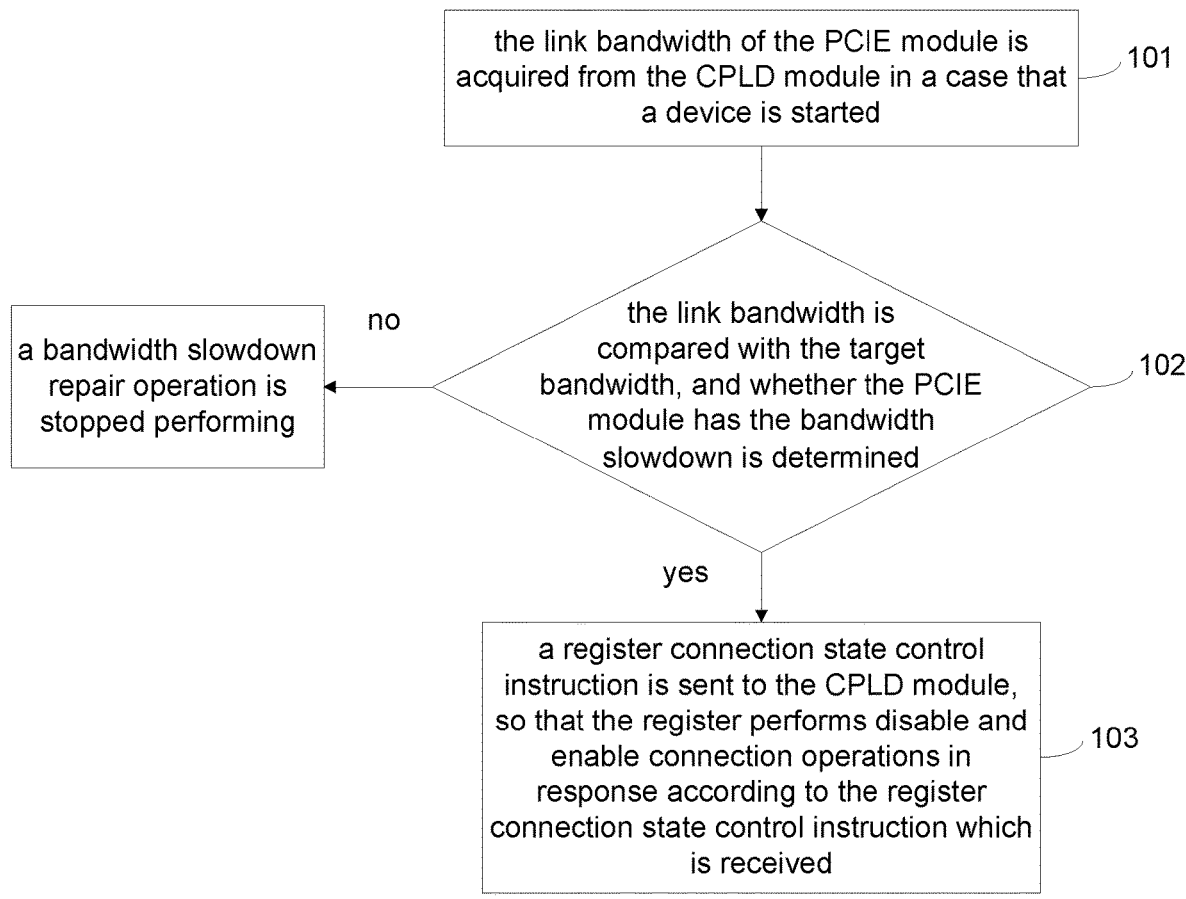
FIG. 1 is a flowchart of a specific example of a method for repairing bandwidth slowdown in the embodiments of the present application.
Figure 2:
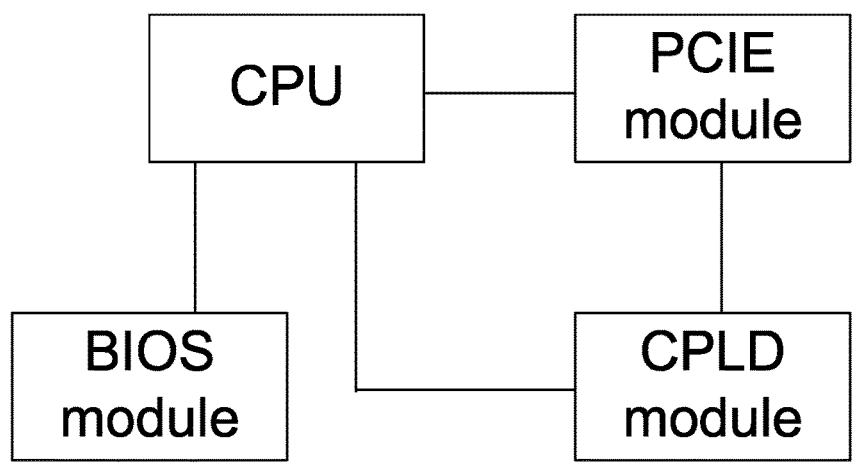
FIG. 2 is a schematic structural diagram corresponding to a specific example of a method for repairing bandwidth slowdown in the embodiments of the present application.

The embodiments of the present application disclose a method for repairing bandwidth slowdown, applied to a BIOS module. As shown in FIG. 2, the BIOS module is connected to one side of a CPLD module with a register and is configured to communicate with the CPLD module; the other side of the CPLD module is connected to a PCIE module configured with a target bandwidth and is configured to acquire a link bandwidth of the PCIE module. A configuration method for the target bandwidth of the PCIE module may be achieved by plugging a video card (for example, PEX8733 card) with a corresponding bandwidth into a device case to complete bandwidth configuration. The BIOS module may achieve information interaction with the CPLD module through an Inter-Integrated Circuit (IIC) Bus. At the same time, the PEX8733 card may send card related information, such as presence information of the card, reset information, power control information, and current link bandwidth information, to the CPLD module. As shown in FIG. 1, the method includes the following steps:

Step 101: the link bandwidth of the PCIE module is acquired from the CPLD module in a case that a device is started.

For example, a device startup process may include the device startup process or the device restart process. When the device startup or the device restart is detected, the link bandwidth of the PCIE module is acquired from the CPLD module through the BIOS module. Specifically, the CPLD module may acquire a current link bandwidth from the PCIE module at a certain time interval, or the CPLD module acquires a current link bandwidth of the PCIE module when the CPLD module receives a link bandwidth acquisition request sent by the BIOS module, and then the CPLD module sends the acquired link bandwidth to the BIOS module through the IIC Bus.

Step 102: the link bandwidth is compared with the target bandwidth, and whether the PCIE module has the bandwidth slowdown is determined. When the PCIE module has the bandwidth slowdown, step 103 is executed.

For example, the target bandwidth may be a bandwidth initially configured for the PCIE module. If the PEX8733 card is configured to support a bandwidth of X16, the target bandwidth is X16. The link bandwidth is compared with the target bandwidth, and if a comparison result indicates that the acquired link bandwidth is inconsistent with the target bandwidth, it indicates that the PCIE module has the bandwidth slowdown, and a bandwidth slowdown repair operation needs to be performed. If the obtained link bandwidth is consistent with the target bandwidth, the bandwidth slowdown repair operation is stopped.

Step 103: a register connection state control instruction is sent to the CPLD module, so that the register performs disable and enable connection operations in response according to the register connection state control instruction which is received.

For example, state switching between register disable connection and register enable connection may be achieved by changing a register address offset bit. For example, it may be pre-designated that the register address offset bit is "0", register responds "enable LINK" operation, and that the register address offset bit is "1", register responds "disable Link" operation. Therefore, the register connection state control instruction sent to the CPLD module may be an instruction used for changing the register address offset bit. Since the instruction for changing the register address offset bit, the register is controlled to perform the disable connection operation first and then perform the enable connection operation in response. The embodiments of the present application do not limit the specific representation form of the register address offset bit. A person skilled in the art may determine the form according to an actual need, as long as the disable and enable connection operations of the register are controlled by changing the address offset bit. The register connection state control instruction may also be a protocol instruction that is sent to the CPLD using a predetermined communication protocol to represent disable connection and enable connection in sequence. After receiving the protocol instruction, the CPLD module performs parsing operations according to the predetermined communication protocol and controls the register to perform the corresponding connection operations in response according to parsing results.

According to the method for repairing the bandwidth slowdown provided in the embodiments of the present application, the register connection state control instruction is sent to the CPLD module, and the register is controlled to perform the disable and enable connection operations in response according to the register connection state control instruction which is received, so that the PCIE module link is initialized and trained again to achieve repairing link bandwidth. The entire process achieves repairing the bandwidth slowdown, and it only takes milliseconds for the register to disable and enable connection, so that the timeliness of repairing the bandwidth slowdown is improved, and the requirement for device startup time is met. In a Linux system, a setpci command may be used to complete the aforementioned bandwidth slowdown repair operation.

As an optional implementation of the present application, in step 103, the register connection state control instruction is sent to the CPLD module in the case that the PCIE module has the bandwidth slowdown, which includes: bandwidth configuration information of the PCIE module is detected; and in a case that the PCIE module is configured with a bandwidth configuration video card, an operation of sending the register connection state control instruction to the CPLD module is performed.

For example, when it is detected that the PCIE module has the bandwidth slowdown, the bandwidth configuration information of the PCIE module is detected first. When the PCIE module is configured with the bandwidth configuration video card (such as PEX8733 card), the subsequent operation of sending the register connection state control instruction is performed. When the PCIE module is not configured with the bandwidth configuration video card and there is only the bandwidth slowdown, the operation of sending the register connection state control instruction to the CPLD module is stopped, so as to avoid performing an invalid bandwidth repair operation without a video card in a device case, which may affect the device startup speed.

Figure 3:
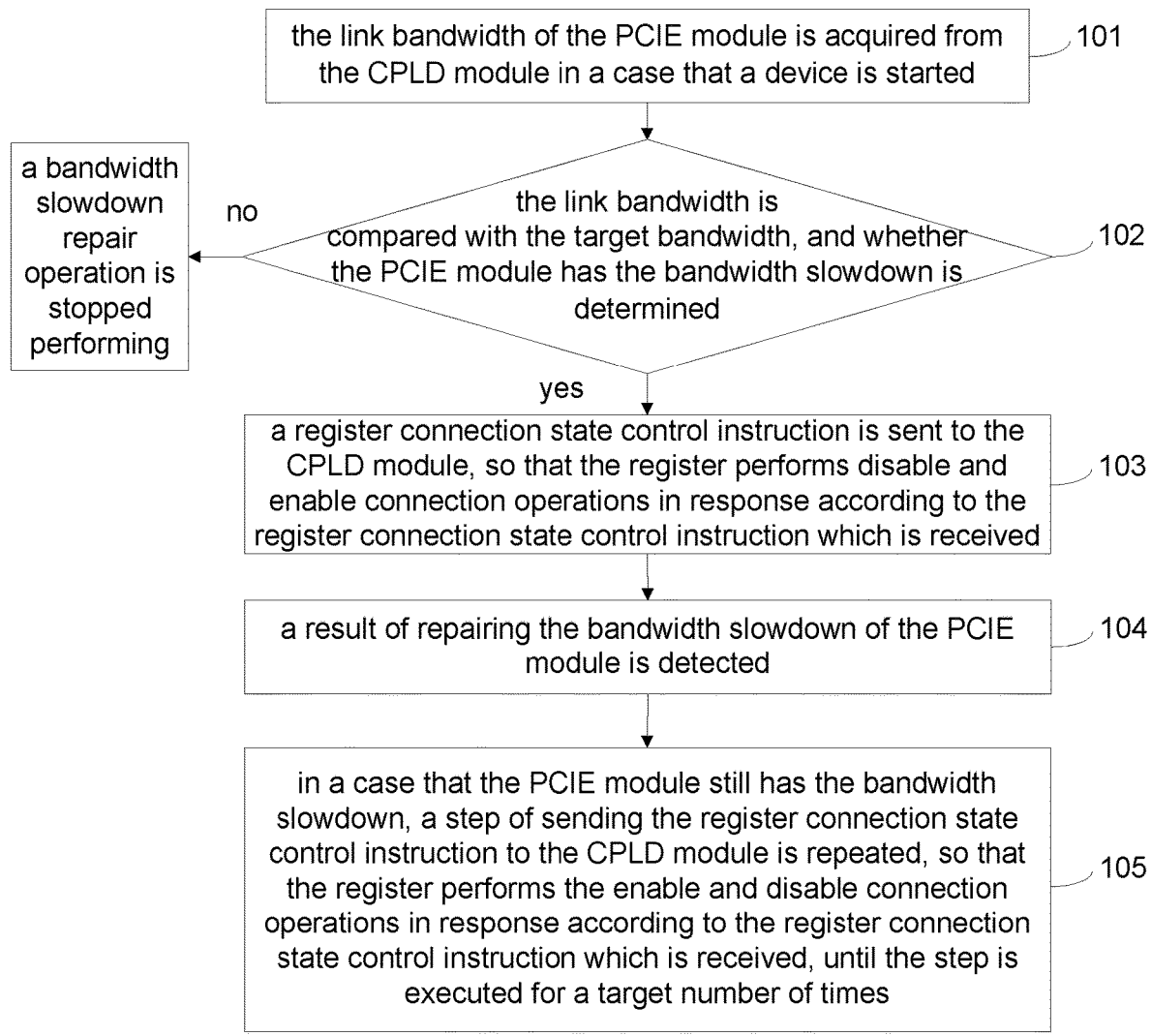
FIG. 3 is a flowchart of a specific example of a method for repairing bandwidth slowdown in the embodiments of the present application.

As an optional implementation of the present application, as shown in FIG. 3, after step 103, the method further includes:

Step 104: a result of repairing the bandwidth slowdown of the PCIE module is detected. For example, a detection method for the result of repairing the bandwidth slowdown may be achieved by acquiring the link bandwidth of the PCIE module from the CPLD module again, comparing the link bandwidth with the target bandwidth, and determining whether the PCIE module still has the bandwidth slowdown. Refer to the corresponding steps of the above embodiment for details, and this will not be described in detail here.

Step 105: in a case that the PCIE module still has the bandwidth slowdown, a step of sending the register connection state control instruction to the CPLD module is repeated, so that the register performs the enable and disable connection operations in response according to the register connection state control instruction which is received, until the step is executed for a target number of times. For example, this embodiment of the present application does not limit the target number of times, and a person skilled in the art may determine the target number of times according to an actual need. In this embodiment of the present application, the target number of times is equal to 3. Since the target number of times of repairing the bandwidth slowdown is set to 3, it may avoid the influence of excessive repeated repair on the startup speed while ensuring reliable repair of the bandwidth slowdown.

Figure 4:
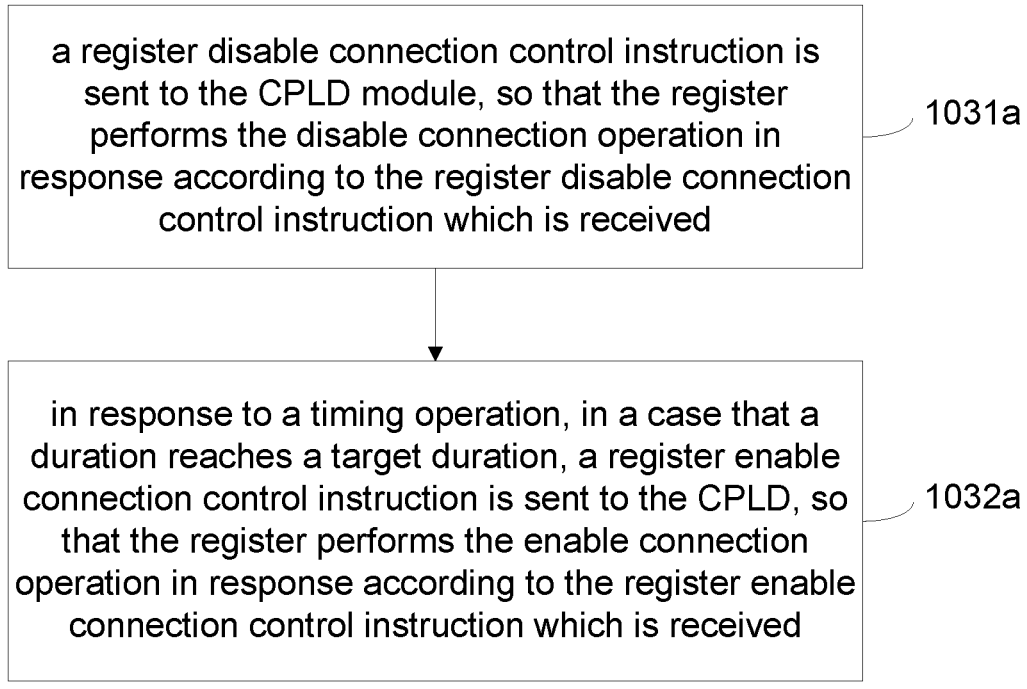
FIG. 4 is a flowchart of a specific example of a method for repairing bandwidth slowdown in the embodiments of the present application.

As an optional implementation of the present application, as shown in FIG. 4, in step 103, the register connection state control instruction is sent to the CPLD module, so that the register performs the disable and enable connection operations in response according to the register connection state control instruction which is received, which includes:

Step 1031a, a register disable connection control instruction is sent to the CPLD module, so that the register performs the disable connection operation in response according to the register disable connection control instruction which is received. Specifically, refer to step 103 in the above embodiment for the method for controlling the register to disable connection by sending the instruction, and it will not be described in detail here.

Step 1032a, in response to a timing operation, in a case that a duration reaches a target duration, a register enable connection control instruction is sent to the CPLD module, so that the register performs the enable connection operation in response according to the register enable connection control instruction which is received. Specifically, refer to step 103 in the above embodiment for the method for controlling the register to enable connection by sending the instruction, and it will not be described in detail here.

For example, in the process that the register first disables connection and then enables connection in response, in order to ensure that the PCIE module may reliably complete the initialization and retraining operations and improve the success rate of repairing the bandwidth slowdown, the register is controlled to perform the enable connection operation after a certain time interval after performing the disable connection operation in response. The target duration may be 40-60 ms, which is preferably 50 ms in this embodiment of the present application. There is no limitation on the setting of the target duration, and a person skilled in the art may determine the target duration according to an actual need.

Figure 5:
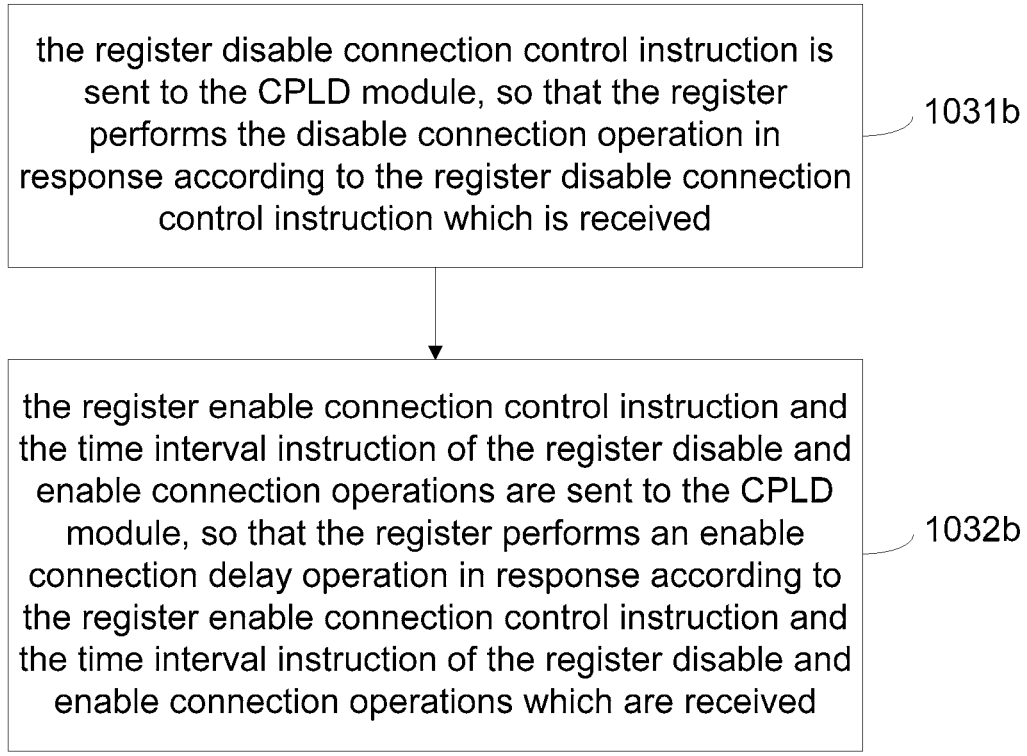
FIG. 5 is a flowchart of a specific example of a method for repairing bandwidth slowdown in the embodiments of the present application.

As an optional implementation of the present application, the register connection state control instruction includes: a register disable connection control instruction, a register enable connection control instruction, and a time interval instruction of the register disable and enable connection operations. As shown in FIG. 5, in step 103, the register connection state control instruction is sent to the CPLD module, so that the register performs the disable and enable connection operations in response according to the register connection state control instruction which is received, which further includes:

Step 1031b, the register disable connection control instruction is sent to the CPLD module, so that the register performs the disable connection operation in response according to the register disable connection control instruction which is received. Specifically, refer to step 103 in the above embodiment for the method for controlling the register to disable connection by sending the instruction, and it will not be described in detail here.

Step 1032b, the register enable connection control instruction and the time interval instruction of the register disable and enable connection operations are sent to the CPLD module, so that the register performs an enable connection delay operation in response according to the register enable connection control instruction and the time interval instruction of the register disable and enable connection operations which are received. Specifically, refer to step 103 in the above embodiment for the method for controlling the register to enable connection by sending the instruction, and it will not be described in detail here.

For example, the register connection state control instruction sent to CPLD includes three instructions at the same time: the register disable connection control instruction, the register enable connection control instruction, and the time interval instruction of the register disable and enable connection operations. The register disable connection control instruction is first sent to the CPLD module, so that the register performs the disable connection operation in response according to the register disable connection control instruction which is received. Then the register enable connection control instruction and the time interval instruction of the register disable and enable connection operations are simultaneously sent to the CPLD module, so that the register enables connection after performing the timing operation of a certain time interval according to the register enable connection control instruction and the time interval instruction of the register disable and enable connection operations which are received, to achieve register enable connection delay control, ensure that the PCIE module may reliably complete the initialization and retraining operations, and improve the success rate of bandwidth slowdown recovery.

As an optional implementation of the present application, the method further includes: the number of times of repairing the bandwidth slowdown of the PCIE module and a result of repairing the bandwidth slowdown corresponding to each repair operation are sent to the register of the CPLD module for storage. The number of times of repair and the result of repairing the bandwidth slowdown corresponding to each repair operation are sent to the register for storage, making it easier for a user to analyze results of repairing bandwidth anomaly using the repair data recorded in the CPLD module.

As an optional implementation of the present application, the method further includes: bandwidth slowdown information of the PCIE module is sent to the CPLD module, so that the CPLD module stores the bandwidth slowdown information to the register.

For example, the bandwidth slowdown information may include, but is not limited to, time of bandwidth anomaly, a device state in case of the anomaly, and a degree of bandwidth slowdown anomaly. The bandwidth slowdown information is stored in the register of the CPLD module, so that it is convenient for a user to perform statistical analysis on the bandwidth anomaly, and it also facilitates other device modules connected to the CPLD module to timely obtain a bandwidth state of the PCIE module from the CPLD.

According to the methods recorded in the above embodiments, a bandwidth slowdown problem in a chip may be repaired timely, which improves the reliability of chip performance and facilitating mass promotion and use in various industries.

The embodiments of the present application further provide an apparatus for repairing bandwidth slowdown. The apparatus is used for implementing the above embodiments and optional implementations. Those described will not be repeatedly described. As used below, the term "component" may implement a combination of software and/or hardware with predetermined functions. Although the apparatuses described in the following embodiments are preferably implemented by software, implementation by hardware or a combination of software and hardware is also possible and conceived.

Figure 6:
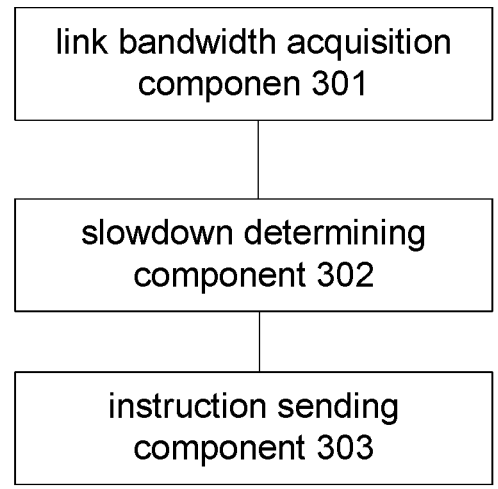
FIG. 6 is a block diagram of a specific example of an apparatus for repairing bandwidth slowdown in the embodiments of the present application.

As shown in FIG. 6, the apparatus is applied to a BIOS module. The BIOS module is connected to one side of a CPLD module and is configured to communicate with the CPLD module; and the other side of the CPLD module is connected to a PCIE module configured with a target bandwidth and is configured to acquire a link bandwidth of the PCIE module. The apparatus includes:

a link bandwidth acquisition component 301, configured to acquire the link bandwidth of the PCIE module from the CPLD module in a case that a device is started;

a slowdown determining component 302, configured to compare the link bandwidth with the target bandwidth, and determine whether the PCIE module has the bandwidth slowdown; and an instruction sending component 303, configured to send a register connection state control instruction to the CPLD module in a case that the PCIE module has the bandwidth slowdown, so that a register performs disable and enable connection operations in response according to the register connection state control instruction which is received.

According to the apparatus for repairing the bandwidth slowdown provided in the embodiments of the present application, when the BIOS module detects that the PCIE module has the bandwidth slowdown in the device startup stage, the BIOS module sends the register connection state control instruction to the CPLD module, and controls the register to perform the disable and enable connection operations in response according to the register connection state control instruction which is received, so that the PCIE module link is initialized and trained again to achieve repairing link bandwidth. In the whole bandwidth slowdown repair process, it only takes milliseconds for the register to disable and enable connection, so that the timeliness of repairing the bandwidth slowdown is improved, and the requirement for device startup time is met.

As an optional implementation of the present application, the instruction sending component 303 includes: a bandwidth configuration information detection component, configured to detect bandwidth configuration information of the PCIE module in the case that the PCIE module has the bandwidth slowdown; and a performing component, configured to in a case that the PCIE module is configured with a bandwidth configuration video card, perform an operation of sending the register connection state control instruction to the CPLD module.

As an optional implementation of the present application, the apparatus further includes: a repair result detection component, configured to detect a result of repairing the bandwidth slowdown of the PCIE module; and an instruction repeated-sending component, configured to: in a case that the PCIE module still has the bandwidth slowdown, repeat a step of sending the register connection state control instruction to the CPLD module, so that the register performs the enable and disable connection operations in response according to the register connection state control instruction which is received, until the step is executed for a target number of times.

As an optional implementation of the present application, the instruction sending component 303 includes: a first instruction sending component, configured to send a register disable connection control instruction to the CPLD module, so that the register performs the disable connection operation in response according to the register disable connection control instruction which is received; and a second instruction sending component, configured to in response to a timing operation, in a case that a duration reaches a target duration, send a register enable connection control instruction to the CPLD module, so that the register performs the enable connection operation in response according to the register enable connection control instruction which is received.

As an optional implementation of the present application, the register connection state control instruction includes: a register disable connection control instruction, a register enable connection control instruction, and a time interval instruction of the register disable and enable connection operations; and the instruction sending component 303 further includes: a third instruction sending component, configured to send the register disable connection control instruction to the CPLD module, so that the register performs the disable connection operation in response according to the register disable connection control instruction which is received; and a fourth instruction sending component, configured to send the register enable connection control instruction and the time interval instruction of the register disable and enable connection operations to the CPLD module, so that the register performs an enable connection delay operation in response according to the r register enable connection control instruction and the time interval instruction of the register disable and enable connection operations which are received.

As an optional implementation of the present application, the apparatus further includes: a first storage component, configured to send the number of times of repairing the bandwidth slowdown of the PCIE module and a result of repairing the bandwidth slowdown corresponding to each repair operation to the register of the CPLD module for storage.

As an optional implementation of the present application, the apparatus further includes: a second storage component, configured to send bandwidth slowdown information of the PCIE module to the CPLD module, so that the CPLD module stores the bandwidth slowdown information to the register.

Figure 7:
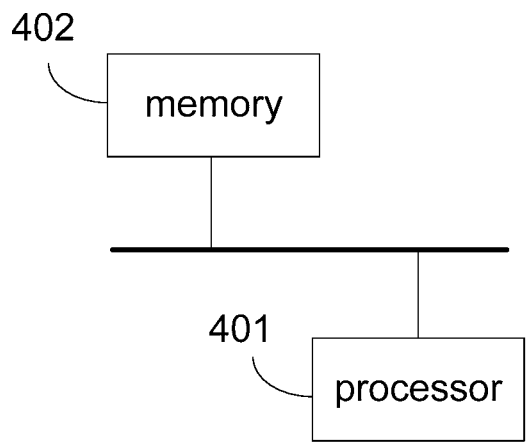
FIG. 7 is a diagram of a specific example of an electronic device in the embodiments of the present application.

The embodiments of the present application further provide an electronic device. As shown in FIG. 7, the electronic device may include: a processor 401 and a memory 402. The processor 401 and the memory 402 may be connected by a bus or in other ways. In FIG. 7, bus connection is taken as an example.

The processor 401 may be a Central Processing Unit (CPU). The processor 401 may also be other general-purpose processors, Digital Signal Processors (DSPs), Application Specific Integrated Circuits (ASICs), Field-Programmable Gate Arrays (FPGAs), or other chips such as a programmable logic device, a discrete gate, a transistor logic device, and a discrete hardware component, or a combination of all the above chips.

The memory 402 is used as a non-transitory computer-readable storage medium that may be configured to store non-transitory software programs, non-transitory computer-executable programs, and components, for example, program instructions/components corresponding to the method for repairing bandwidth slowdown in the embodiments of the present application. The processor 401 runs the non-transitory software programs, instructions, and components stored in the memory 402, so as to perform various functional applications and data processing of the processor, thus implementing the method for repairing bandwidth slowdown in the method embodiments.

The memory 402 may include a program storage region and a data storage region. The program storage region may store an operating system and an application program required by at least one function. The data storage region may store data created by the processor 401. In addition, the memory 402 may include a high-speed random access memory, and may further include a non-transitory memory, such as at least one magnetic disk storage device, a flash memory device, or other non-transitory solid-state storage devices. In some embodiments, the memory 402 optionally includes memories remotely provided with respect to the processor 401, and these remote memories may be connected to the processor 401 through a network. Examples of the above network include, but are not limited to, the Internet, an intranet, a local area network, a mobile communication network, and combinations thereof.

The one or more components are stored in the memory 402. When executed by the processor 401, the components perform the method for repairing bandwidth slowdown in the embodiments as shown in FIG. 1 to FIG. 5.

Refer to the corresponding related descriptions and effects in the embodiments shown in FIG. 1 to FIG. 5 for understanding of specific details of the above electronic device, which will not be described in detail here.

Figure 8:
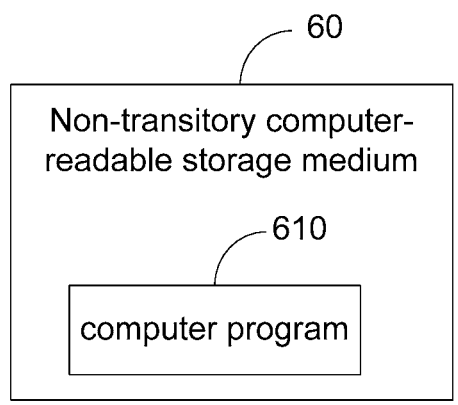
FIG. 8 is a diagram of a specific example of a storage medium in the embodiments of the present application.

Those skilled in the art may understand that implementation of all or a part of the processes in the method of the foregoing embodiment may be completed by a computer program that instructs relevant hardware. As shown in FIG. 8, the computer program 610 may be stored in a non-transitory computer-readable storage medium 60. The computer program 610 may include the processes of the embodiments of the foregoing methods when executed. The non-transitory computer-readable storage medium 60 may be a magnetic disk, an optical disk, a read-only memory (ROM), a random access memory (RAM), a flash memory, a hard disk drive (HDD) or solid-state drive (SSD), etc.; and the storage medium may also include a combination of the above-mentioned kinds of memories.

Although the embodiments of the present application are described in conjunction with the accompanying drawings, those skilled in the art may make various modifications and variations without departing from the spirit and scope of the present application. These modifications and variations fall within the scope defined by the accompanying claims.

What is claimed is:

1. A method for repairing bandwidth slowdown, wherein the method is applied to a Basic Input Output System (BIOS) module, the BIOS module is connected to one side of a Complex Programmable Logic Device (CPLD) module with a register and is configured to communicate with the CPLD module; another side of the CPLD module is connected to a Peripheral Component Interconnect Express (PCIE) module configured with a target bandwidth and is configured to acquire a link bandwidth of the PCIE module; the method comprises:
   acquiring the link bandwidth of the PCIE module from the CPLD module in a case that the PCIE module is started;
   comparing the link bandwidth with the target bandwidth, and determining whether the PCIE module has the bandwidth slowdown; and
   sending a register connection state control instruction to the CPLD module in a case that the PCIE module has the bandwidth slowdown, so that the register performs disable and enable connection operations in response according to the register connection state control instruction which is received,
   wherein the BIOS module is connected to the side of the CPLD with the register and is configured to communicate with the CPLD module comprises:
   the BIOS module is connected to the side of the CPLD module with the register through a Central Processing Unit (CPU), and the BIOS module communicates with the CPLD module through an Inter-Integrated Circuit (IIC) bus,
   wherein the register connection state control instruction comprises: a register disable connection control instruction, a register enable connection control instruction, and a time interval instruction of the register disable and enable connection operations; and
   sending the register connection state control instruction to the CPLD module, so that the register performs the disable and enable connection operations in response according to the register connection state control instruction which is received further comprises:
   sending the register disable connection control instruction to the CPLD module, so that the register performs the disable connection operation in response according to the register disable connection control instruction which is received; and
   sending the register enable connection control instruction and the time interval instruction of the register disable and enable connection operations to the CPLD module simultaneously, so that the register performs the enable connection operation in response after performing a timing operation of a certain time interval according to the register enable connection control instruction and the time interval instruction of the register disable and enable connection operations which are received.

2. The method according to claim 1, wherein sending the register connection state control instruction to the CPLD module in the case that the PCIE module has the bandwidth slowdown comprises:
   detecting bandwidth configuration information of the PCIE module in a case that the PCIE module has the bandwidth slowdown; and
   performing, in a case that the PCIE module is configured with a bandwidth configuration video card, an operation of sending the register connection state control instruction to the CPLD module, wherein the PCIE module is configured with a bandwidth configuration video card refers to that a video card with a bandwidth is plugged into a device case of the PCIE module.

3. The method according to claim 1, wherein after sending the register connection state control instruction to the CPLD module in the case that the PCIE module has the bandwidth slowdown, so that the register performs the enable and disable connection operations in response according to the register connection state control instruction which is received, the method further comprises:

detecting a result of repairing the bandwidth slowdown of the PCIE module; and in a case that the PCIE module still has the bandwidth slowdown, repeating a step of sending the register connection state control instruction to the CPLD module, so that the register performs the enable and disable connection operations in response according to the register connection state control instruction which is received, until the step is executed for a target number of times.

4. The method according to claim 1, wherein sending the register connection state control instruction to the CPLD module, so that the register performs the enable and disable connection operations in response according to the register connection state control instruction which is received comprises:

sending a register disable connection control instruction to the CPLD module, so that the register performs the disable connection operation in response according to the register disable connection control instruction which is received; and in response to a timing operation, in a case that a duration reaches a target duration, sending a register enable connection control instruction to the CPLD module, so that the register performs the enable connection operation in response according to the register enable connection control instruction which is received.

5. The method according to claim 3, wherein the method further comprises:

sending the number of times of repairing the bandwidth slowdown of the PCIE module and a result of repairing the bandwidth slowdown corresponding to each repair operation to the register of the CPLD module for storage.

6. The method according to claim 1, wherein the method further comprises:

sending bandwidth slowdown information of the PCIE module to the CPLD module, so that the CPLD module stores the bandwidth slowdown information to the register.

7. An electronic device, comprising: at least one processor; and a memory in communication connection with the at least one processor, wherein the memory stores instructions executable by the at least one processor; and the instructions, when executed by the at least one processor, cause the at least one processor to:

acquire a link bandwidth of a Peripheral Component Interconnect Express (PCIE) module from a Complex Programmable Logic Device (CPLD) module in a case that the PCIE module is started;

compare the link bandwidth with a target bandwidth, and determine whether the PCIE module has bandwidth slowdown; and send a register connection state control instruction to the CPLD module in a case that the PCIE module has the bandwidth slowdown, so that the register performs disable and enable connection operations in response according to the register connection state control instruction which is received, wherein a BIOS module is connected to the side of the CPLD with the register and is configured to communicate with the CPLD module comprises:

the BIOS module is connected to the side of the CPLD module with the register through a Central Processing Unit (CPU), and the BIOS module communicates with the CPLD module through an Inter-Integrated Circuit (IIC) bus, wherein the register connection state control instruction comprises: a register disable connection control instruction, a register enable connection control instruction, and a time interval instruction of the register disable and enable connection operations; and sending the register connection state control instruction to the CPLD module, so that the register performs the disable and enable connection operations in response according to the register connection state control instruction which is received further comprises:

sending the register disable connection control instruction to the CPLD module, so that the register performs the disable connection operation in response according to the register disable connection control instruction which is received; and sending the register enable connection control instruction and the time interval instruction of the register disable and enable connection operations to the CPLD module simultaneously, so that the register performs the enable connection operation in response after performing a timing operation of a certain time interval according to the register enable connection control instruction and the time interval instruction of the register disable and enable connection operations which are received.

8. A non-transitory computer-readable storage medium, storing a computer program, wherein the computer program, when executed by a processor, the computer program is configured to cause the processor to:

acquire a link bandwidth of a Peripheral Component Interconnect Express (PCIE) module from a Complex Programmable Logic Device (CPLD) module in a case that the PCIE module is started;

compare the link bandwidth with a target bandwidth, and determine whether the PCIE module has bandwidth slowdown; and send a register connection state control instruction to the CPLD module in a case that the PCIE module has the bandwidth slowdown, so that the register performs disable and enable connection operations in response according to the register connection state control instruction which is received, wherein a BIOS module is connected to the side of the CPLD with the register and is configured to communicate with the CPLD module comprises:

the BIOS module is connected to the side of the CPLD module with the register through a Central Processing Unit (CPU), and the BIOS module communicates with the CPLD module through an Inter-Integrated Circuit (IIC) bus, wherein the register connection state control instruction comprises: a register disable connection control instruction, a register enable connection control instruction, and a time interval instruction of the register disable and enable connection operations; and sending the register connection state control instruction to the CPLD module, so that the register performs the disable and enable connection operations in response according to the register connection state control instruction which is received further comprises:

sending the register disable connection control instruction to the CPLD module, so that the register performs the disable connection operation in response according to the register disable connection control instruction which is received; and sending the register enable connection control instruction and the time interval instruction of the register disable and enable connection operations to the CPLD module simultaneously, so that the register performs the enable connection operation in response after performing a timing operation of a certain time interval according to the register enable connection control instruction and the time interval instruction of the register disable and enable connection operations which are received.

9. The method according to claim 1, wherein a configuration method for the target bandwidth of the PCIE module is achieved by plugging a video card with the target bandwidth into a device case of the PCIE module.

10. The method according to claim 1, wherein the BIOS module achieves information interaction with the CPLD module through an Inter-Integrated Circuit (IIC) Bus.

11. The method according to claim 9, wherein the video card sends presence information of the video card, reset information, power control information, and current link bandwidth information to the CPLD module.

12. The method according to claim 1, wherein acquiring the link bandwidth of the PCIE module from the CPLD module in the case that the PCIE module is started comprises:

acquiring the link bandwidth of the PCIE module from the CPLD module in a device startup process or in a device restart process, wherein a current link bandwidth is acquired from the PCIE module by the CPLD module at a certain time interval.

13. The method according to claim 10, wherein acquiring the link bandwidth of the PCIE module from the CPLD module in the case that the PCIE module is started comprises:

sending a link bandwidth acquisition request to the CPLD module in a device startup process or in a device restart process, so that the CPLD module acquires the link bandwidth;

receiving the link bandwidth from the CPLD module through the IIC Bus.

14. The method according to claim 1, wherein the target bandwidth is a bandwidth initially configured for the PCIE module.

15. The method according to claim 1, wherein comparing the link bandwidth with the target bandwidth, and determining whether the PCIE module has the bandwidth slowdown comprises:

comparing the link bandwidth with the target bandwidth to obtain a comparison result;

in a case that the comparison result indicates that the link bandwidth is inconsistent with the target bandwidth, determining that the PCIE module has the bandwidth slowdown;

in a case that the comparison result indicates that the link bandwidth is consistent with the target bandwidth, determining stopping a bandwidth slowdown repair operation.

16. The method according to claim 1, wherein the disable and enable connection operations of the register are achieved by changing a register address offset bit.

17. The method according to claim 4, wherein the target duration is 40-60 ms.

18. The method according to claim 6, wherein the bandwidth slowdown information comprises time of bandwidth anomaly, a device state in case of the anomaly, and a degree of bandwidth slowdown anomaly.

* * * * *